United States Patent Office.

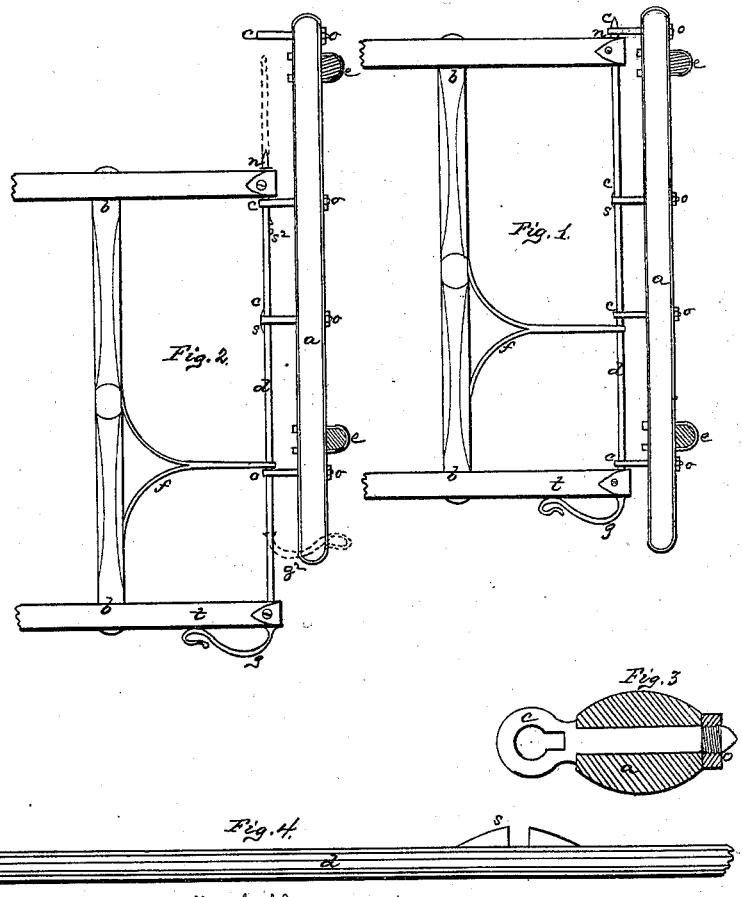
H. F. Edwards & W. C. Whiting.
Attaching Thills to Sleighs.
N°. 66817.  Patented Jul. 16. 1867.

HENRY F. EDWARDS AND WILLIAM C. WHITING, OF WORCESTER, MASSACHUSETTS.

*Letters Patent No. 66,817, dated July 16, 1867; antedated July 8, 1867.*

IMPROVEMENT IN ATTACHING THILLS TO SLEIGHS, &c.

*The Schedule referred to in these Letters Patent and making part of the same.*

TO ALL WHOM IT MAY CONCERN:

Be it known that we, HENRY F. EDWARDS and WILLIAM C. WHITING, both of the city and county of Worcester, and Commonwealth of Massachusetts, have invented a new and improved Mode of Attaching Thills to Sleighs, and changing the same from centre draught to side draught; and we do hereby declare that the following is a full and exact description thereof, reference being had to the accompanying drawings, and to the letters of reference marked thereon, in which—

Figure 1 represents the cross-bar connected with the forward end of the runners of a sleigh, with a section of the thills attached by our connecting-rod arranged for centre draught.

Figure 2 represents the same changed to side draught.

Figure 3 represents a section of the cross-bar with a slotted eye-bolt passing through it, full size.

Figure 4 represents a section of the connecting-rod with a key upon one side, full size.

The object of our invention is to attach and detach thills to and from sleighs with facility and dispatch, and to change the same from centre to side draught, and *vice versa*, thus accommodating or adapting them to the character of the roads upon which they are used. This we accomplish by the use of the iron rod $d$, fig. 1, passing through the end of the thills $b$, and also through any sufficient number of slotted eyes $c\,c\,c\,c$, which are connected with the cross-bar $a$, and secured by nuts $o\,o\,o\,o$ or their equivalents. Upon the connecting-rod $d$ is a notched protuberance or key, (as seen at $s$ in fig. 4,) which corresponds with the slot in the slotted eye $c$, as seen more fully in fig. 3. The connecting-rod $d$, figs. 1 and 2, is, when in use, secured from being withdrawn by the single nut $n$ at the end of the thill, and from turning in the slotted eyes by a notch in the side of the thill at $t$, into which the end of the crank $g$ falls or springs.

To change from centre to side draught we remove the end of the crank $g$ from the notch $t$ and turn the connecting-rod by the crank until the key $s$ comes in conjunction with the slots in the eyes $c\,c\,c\,c$, the crank and key being then in the direction of $s^2$ and $g^2$, fig. 2, the thills can then be moved to the left with the connecting-rod until they reach the desired position, when the crank $g$ is turned back into its original position and secured at $t$, fig. 2; thus the transition is complete.

To detach the thills entirely we remove the nut $n$ from the connecting-rod $d$, which enables us to withdraw the rod from the thills and eyes, completely detaching the thills from the sleigh or other vehicle.

Having thus described the nature and operation of our invention, what we claim and wish to secure by Letters Patent, is—

The combination of the connecting-rod $d$ with a key, $s$, or its equivalent, attached with any number of slotted eyes $c\,c\,c\,c$, through which the rod $d$ may pass and in which it may turn, the key $s$ and the slots in the eyes $c\,c\,c\,c$ being at such relative position as may be desirable or convenient, in the manner and for the purposes set forth.

HENRY F. EDWARDS,
WILLIAM C. WHITING.

Witnesses:
CHAS. W. WHITING.
BENJA. DIKE.